UNITED STATES PATENT OFFICE 2,628,239

ESTERS OF ALPHA-ACYL-ALPHA-NAPHTHO-QUINONYLSUCCINIC ACID AND PROCESS

Elbert C. Ladd, Passaic, N. J., assignor to United States Rubber Company, New York, N. Y., a corporation of New Jersey No Drawing. Application November 16, 1949, Serial No. 127,793

8 Claims. (Cl. 260—396)

This invention relates to a new class of compounds, namely, the 2-chloro-1,4-naphthoquinones having substituted in the 3-position the residue obtained by removing the active hydrogen atom from a di-ester of an alpha-acylsuccinic acid, and to a method of making the same.

I have discovered that di-esters of alpha-acylsuccinic acids will react with 2,3-dichloro-1,4-naphthoquinone to produce products wherein the residue of the di-ester of the alpha-acylsuccinic acid replaces one of the chlorine atoms of the dichloronaphthoquinone.

The reaction of my invention may be carried out by reacting the di-ester of the alpha-acylsuccinic acid as such with the dichloronaphthoquinone in the presence of a hydrogen halide acceptor whereby a halogen atom of the quinone is replaced with the residue of the di-ester of the alpha-acylsuccinic acid, and hydrogen halide is eliminated and taken up by the hydrogen halide acceptor. Any suitable hydrogen halide acceptor known to the art may be used, examples being strong bases such as the quaternary ammonium hydroxides, e. g., trimethyl benzyl ammonium hydroxide, and the alkali metal and alkaline earth metal oxides and hydroxides, e. g., those of sodium, calcium, potassium, barium and strontium. The hydrogen halide acceptor may be carried on a suitable support in known manner.

I prefer however, to use the di-ester of the alpha-acylsuccinic acid in the form of its sodio derivative and to react such sodio derivative directly with the dichloro-naphthoquinone. In this way, use of a hydrogen halide acceptor is obviated, since no hydrogen halide is evolved. The reaction involves formation of sodium halide instead.

The di-esters of alpha-acylsuccinic acid which may be used in the practice of my invention have the following general formula

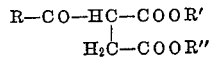

where R, R' and R'' can be an hydrocarbon group devoid of ethylenic and acetylenic unsaturation, such as alkyl, cycloalkyl, aryl, aralkyl and alkaryl. For reasons of economy and availability, I prefer those compounds wherein R, R' and R'' are alkyl, especially lower alkyl. R' and R'' are almost invariably identical.

Specific examples of di-esters useful in my invention are diethyl alpha-acetylsuccinate, dibutyl alpha-acetylsuccinate and diethyl alpha-butyrylsuccinate.

The reaction appears to proceed in accordance with the following Equations I and II which portray the reaction of 2,3-dichloro-1,4-naphthoquinone with the di-ester of the alpha-acylsuccinic acid as such and as its sodio derivative, respectively:

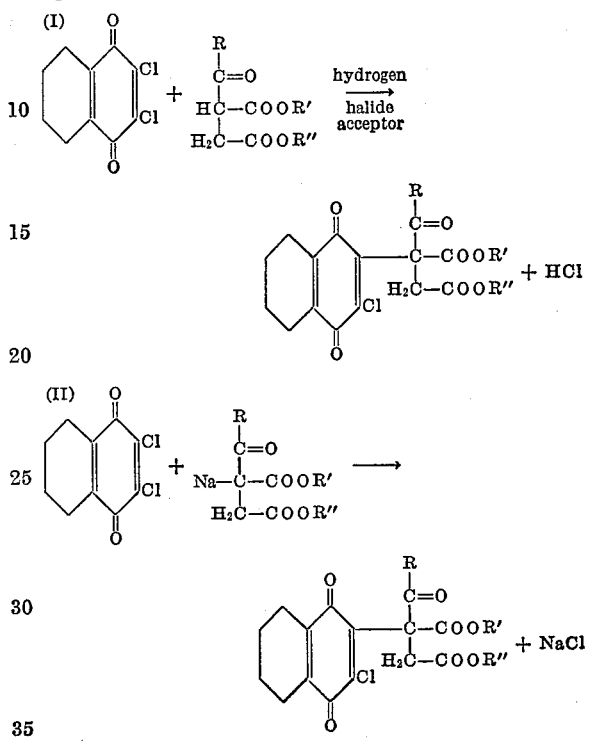

It is noteworthy that in my process, the di-ester of the alpha-acylsuccinic acid is found to react substantially exclusively with one only of the two halogen atoms, whereby a monochloronaphthoquinonyl acylsuccinic ester is obtained as virtually the sole product. This result is obtained even though a molar excess of the di-ester of the alpha-acylsuccinic acid over the dichloronaphthoquinone is employed, as in the example below.

The reaction of my invention can be carried out by mixing the dichloronaphthoquinone with the sodio derivative of the di-ester of the alpha-acylsuccinic acid, preferably in the presence of an inert mutual solvent such as dioxane, and heating the mixture at an elevated temperature, typically in the range from 50° C. to 125° C., until reaction is substantially complete. The product is then recovered from the reaction mixture in any suitable way.

Where the di-ester itself is used instead of its sodio derivative, the reaction may be carried out in the same manner but with a hydrogen halide acceptor present in the reaction mixture.

In carrying out my reaction, I prefer to use an amount of the di-ester which is about stoichiometrically equivalent to the dichloronaphthoquinone, i. e., a mol ratio of about 1:1. I may use more of the di-ester although such use of an excess appears to offer no advantage over the use of equimolar amounts of the reactants.

The products of my invention are useful as curing agents for rubber, as dye intermediates, as polymerization inhibitors for lengthening the storage life of addition type monomers, and as anti-oxidants, corrosion inhibitors and oiliness improvers for lubricating oils.

The following example illustrates my invention in more detail.

*Example*

To 26.6 g. of diethyl alpha-acetylsuccinate diluted with 50 ml. of dioxane are added 2.3 g. of metallic sodium. After the sodium has dissolved the resulting solution is added to a solution of 15 g. of 2,3-dichloro-1,4-naphthoquinone in 200 ml. of dioxane and thereafter is heated on a steam bath for 1½ hrs. during which time the reaction mixture develops a reddish brown color. The mixture is then cooled and made acid with hydrochloric acid. The mixture is filtered and the small amount of precipitate discarded. The filtrate is poured into water and the brown solid which forms is filtered off, washed with water and air-dried. There is thus obtained 24 g. of product. Recrystallization of the product from 95% ethanol gives a light yellow crystalline precipitate having the following properties: M. P. 126.5-127.0° C.; % chlorine found: 9.26% (calculated for $C_{20}H_{19}O_7Cl$: 8.72%). The product may be called the diethyl ester of alpha-acetyl-alpha(2-chloro-1,4-naphthoquinon-3-yl) succinic acid.

Having thus described my invention, what I claim and desire to protect by Letters Patent is:

1. A compound formed by the replacement of a chlorine atom of 2,3-dichloro-1,4-naphthoquinone with the residue obtained by removing the active hydrogen atom from a di-ester of an alpha-acylsuccinic acid, said di-ester having the formula

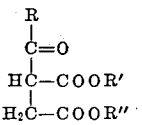

where R, R' and R'' are lower alkyl.

2. A compound formed by the replacement of a chlorine atom of 2,3-dichloro-1,4-naphthoquinone with the residue obtained by removing the active hydrogen atom from a di-lower alkyl ester of alpha-acetylsuccinic acid.

3. A compound formed by the replacement of a chlorine atom of 2,3-dichloro-1,4-naphthoquinone with the residue obtained by removing the active hydrogen atom from diethyl alpha-acetylsuccinate.

4. The method which comprises heating 2,3-dichloro-1,4-naphthoquinone with the sodio derivative of diethyl alpha-acetylsuccinate at an elevated temperature ranging from 50° to 125° C., and recovering from the resulting reaction mixture a compound derived from said 2,3-dichloro-1,4-naphthoquinone by replacement of a chlorine atom thereof with the residue obtained by removing the active hydrogen atom from diethyl alpha-acetylsuccinate.

5. The method which comprises heating a mixture of 2,3-dichloro-1,4-naphthoquinone and a compound selected from the group consisting of di-esters of an alpha-acylsuccinic acid having the formula

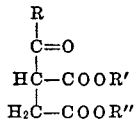

where R, R' and R'' are lower alkyl, and sodio derivatives of said di-esters, a hydrogen chloride acceptor being present when said compound is a di-ester of the foregoing formula, at an elevated temperature ranging from 50° to 125° C., and recovering from the resulting reaction mixture a compound derived by the replacement of one of the chlorine atoms of said 2,3-dichloro-1,4-naphthoquinone with the residue obtained by removing the active hydrogen atom from said di-ester.

6. A compound formed by the replacement of a chlorine atom of 2,3-dichloro-1,4-naphthoquinone with the residue obtained by removing the active hydrogen atom from a di-lower alkyl ester of an alpha-acylsuccinic acid in which the acyl group has the formula

R being lower alkyl.

7. A compound formed by the replacement of a chlorine atom of 2,3-dichloro-1,4-naphthoquinone with the residue obtained by removing the active hydrogen atom from a di-lower alkyl ester of alpha-acetylsuccinic acid.

8. The method which comprises heating a mixture of 2,3-dichloro-1,4-naphthoquinone and a compound selected from the group consisting of di-lower alkyl esters of an alpha-acylsuccinic acid in which the acyl group has the formula

R being lower alkyl, and sodio derivatives of said esters, a hydrogen chloride acceptor being present when said compound is one of said esters, at an elevated temperature ranging from 50° to 125° C., and recovering from the resulting reaction mixture a compound derived by the replacement of one of the chlorine atoms of said 2,3-dichloro-1,4-naphthoquinone with the residue obtained by removing the active hydrogen atom from said ester.

ELBERT C. LADD.

No references cited.